(12) United States Patent
Chung

(10) Patent No.: US 9,489,586 B2
(45) Date of Patent: Nov. 8, 2016

(54) TRAFFIC SIGN RECOGNIZING APPARATUS AND OPERATING METHOD THEREOF

(71) Applicant: Hyundai Mobis Co., Ltd., Seoul (KR)

(72) Inventor: Soon wook Chung, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/697,021

(22) Filed: Apr. 27, 2015

(65) Prior Publication Data

US 2016/0117562 A1  Apr. 28, 2016

(30) Foreign Application Priority Data

Oct. 23, 2014  (KR) .................. 10-2014-0144322

(51) Int. Cl.
*G06K 9/00* (2006.01)
*G06K 9/46* (2006.01)
*G06K 9/62* (2006.01)

(52) U.S. Cl.
CPC ......... *G06K 9/00818* (2013.01); *G06K 9/4652* (2013.01); *G06K 9/6215* (2013.01)

(58) Field of Classification Search
CPC .............. G06K 9/00798; G06K 9/00825; G06K 9/00791; G06K 9/00818; G06K 9/00288; G06K 9/3241; G06K 9/4652; G06T 7/0075; G06T 1/0007; G06T 2207/10004; G06T 2207/10012; G06T 2207/10021; G06T 2207/10024; G06T 7/2033
See application file for complete search history.

(56) References Cited

U.S. PATENT DOCUMENTS

2004/0086153 A1* 5/2004 Tsai .................... G06K 9/3233
382/104
2012/0123613 A1* 5/2012 Waki .................... G08G 1/167
701/1
2013/0253754 A1* 9/2013 Ferguson ............ G05D 1/0231
701/28

FOREIGN PATENT DOCUMENTS

KR  10-2010-0064140   6/2010
KR  10-2014-0061156   5/2014
KR  10-2014-0066847   6/2014

* cited by examiner

*Primary Examiner* — Amara Abdi
(74) *Attorney, Agent, or Firm* — H.C. Park & Associates, PLC

(57) ABSTRACT

Disclosed are an apparatus for recognizing a traffic sign and an operating method thereof. The apparatus for recognizing a traffic sign according to an exemplary embodiment of the present invention includes: an image obtaining unit configured to obtain an image from a vehicle to a predetermined range; a region of interest designating unit configured to recognize a traffic sign within the image, and designate an area including the traffic sign as a region of interest; a valid area extracting unit configured to extract a valid area except for an area of a first color from the region of interest, and calculate valid area data; and a similarity calculating unit configured to calculate similarity of the traffic sign by using the valid area data.

18 Claims, 11 Drawing Sheets

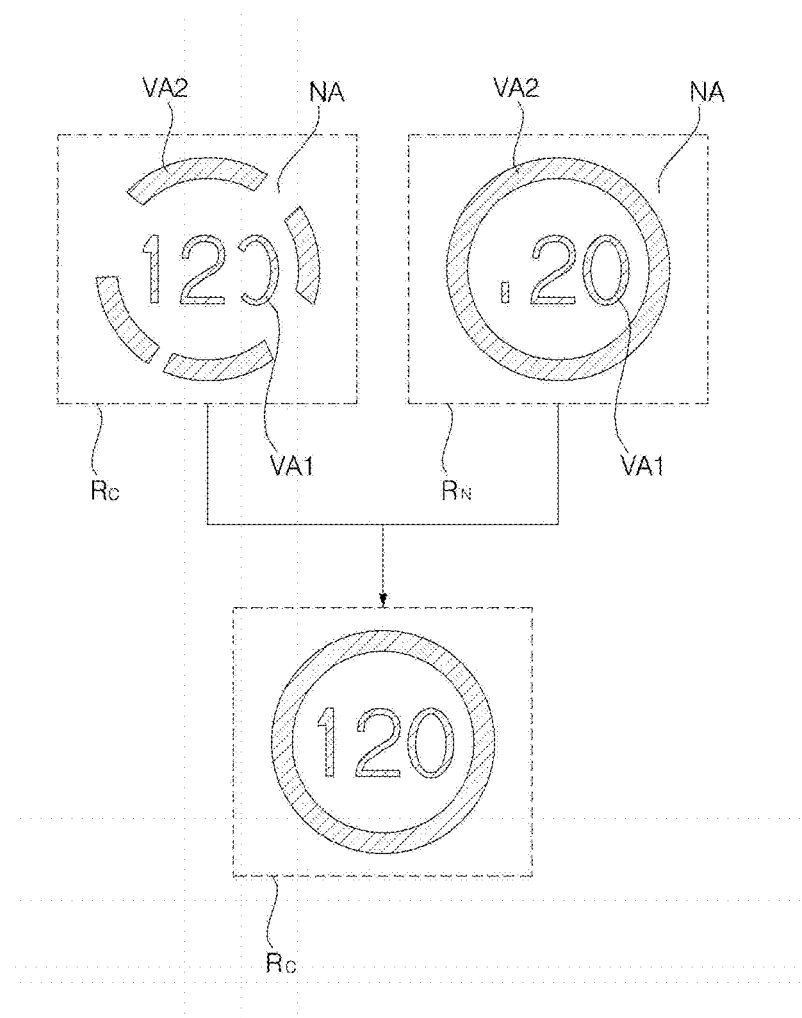

TRAFFIC SIGN RECOGNIZING APPARATUS AND OPERATING METHOD THEREOF

CROSS-REFERENCE TO RELATED APPLICATION

This application claims priority from and the benefit of Korean Patent Application Number 10-2014-0144322 filed Oct. 23, 2014, which is hereby incorporated by reference for all purposes as if fully set forth herein.

BACKGROUND

1. Field

Exemplary embodiments relate to a traffic sign recognizing apparatus and an operating method thereof, and more particularly, exemplary embodiments relate to a traffic sign recognizing apparatus, which is capable of improving performance of recognizing a traffic sign while a vehicle travels, and an operating method thereof.

2. Discussion of the Background

As information technology has rapidly developed, development of technology for various vehicle-related electronic devices related has also accelerated.

As various driver assistant technologies have been developed for notifying a driver of relevant information by analyzing an image photographed by a camera. Technology for preventing dangerous situations has been suggested, such as acceleration. Technology for supporting a driving path by recognizing road traffic signs and transmitting relevant information from the sign to a driver has also been suggested, in addition to technologies with functions such as lane departure alarms, vehicle collision alarms, and the like.

The technology of recognizing a traffic sign based on an image detects a sign area by using an algorithm recognizing a specific pattern within an image. Further, there is a technology, which has also been publicly known, for increasing a recognition rate for an object including a traffic sign by applying a tracking algorithm to data about a previously detected object and calculating similarity, in order to supplement a situation, in which a sign area is not detected or is erroneously detected according to a general condition of a road.

Most of the traffic signs have specific shapes and forms unlike other objects. For example, a shape of a traffic sign may include a specific circular form or a color feature with a red border, and a special feature of the traffic sign may be used as a comparison part for utilizing a tracking algorithm and detecting the traffic sign, so that it is possible to detect the traffic sign more easily compared to other objects.

In general, when a specific pattern related to a predetermined object is recognized within an image, a meaningful change is not generated in a subsequent frame for an already recognized object in most cases, so that it is not greatly difficult to apply the aforementioned tracking algorithm.

However, special case traffic signs, wherein a light emitting traffic sign includes a light source, such as an LED, is different from the aforementioned general case.

Particularly, when a light source is operated using a pulse width modulation method, it may be recognized by the naked eyes that the light source of the traffic sign is continuously turned on, but in actuality, the light source is repeatedly turned on and off over a predetermined cycle.

In this state, there is a considerably large possibility that an error can occur in analyzing an image generated by a camera and accurately recognizing such a traffic sign. A particular reason is that a shutter repeatedly receives and blocks light at a predesigned speed when the camera photographs a roadside or neighboring space of a vehicle. That is, a situation may occur wherein a partial area of a traffic sign will not be sufficiently shown in an image periodically captured by the camera, in contrast to the recognition by the naked eyes.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a traffic sign recognizing apparatus, which is capable of improving performance of recognizing a traffic sign while a vehicle travels, and an operating method thereof.

Additional aspects will be set forth in the detailed description which follows, and, in part, will be apparent from the disclosure, or may be learned by practice of the inventive concept.

Particularly, the present invention has been made in an effort to decrease the negative influence (for example, erroneous recognition and non-recognition of a traffic sign) generated by a periodic on/off operation of a light source included in a light emitting traffic sign when the traffic sign is recognized.

Objects of the present invention are not limited to the objects described above, and other objects that are not described will be clearly understood by a person skilled in the art from the description below.

An exemplary embodiment of the present invention provides an apparatus for recognizing a traffic sign, including: an image obtaining unit configured to obtain an image from a vehicle to a predetermined range; a region of interest designating unit configured to recognize a traffic sign within the image, and designate an area including the traffic sign as a region of interest; a valid area extracting unit configured to extract a valid area except for an area of a first color from the region of interest, and calculate valid area data; and a similarity calculating unit configured to calculate similarity between the traffic signs recognized from respective images by using the valid area data.

Another exemplary embodiment of the present invention provides an operating method of an apparatus for recognizing a traffic sign, including: obtaining an image from a vehicle to a predetermined range; designating an area including a traffic sign within the image as a region of interest; extracting a valid area except for an area of a first color in the region of interest; calculating valid area data including information on at least one of a size, a shape, a color, definition, and a ratio of the valid area; and comparing valid area data for a traffic sign recognized at a predetermined time with pre-stored data for comparison, and calculating similarity between the traffic signs recognized from respective images.

Other detailed matters of the exemplary embodiments are included in the detailed description and the drawings to be described below.

According to the exemplary embodiments of the present invention, it is possible to provide the traffic sign recognizing apparatus, which is capable of improving performance of recognizing a light emitting traffic sign, as well as a non-emitting light traffic sign, and the operating method thereof.

Particularly, it is possible to remarkably improve traffic sign recognition performance by extracting a valid area based on a predetermined color from the entire area corresponding to the traffic sign within an image, and calculating similarity between traffic signs by using the corresponding valid area, compared to the related art in which similarity is calculated with a non-valid area.

Similarity may be calculated by using information about a valid area, excluding a non-valid area, from the entire area of a traffic sign, thereby considerably decreasing the amount of calculation compared to a conventional method in which similarity is calculated including a non-valid area.

It is also possible to obtain a more accurate recognition result by utilizing information about a speed and a direction of a vehicle for recognizing a traffic sign.

It is also possible to provide improve recognition results for a traffic sign by continuously updating data for comparison with a sequentially recognized traffic sign even though an external environment, such as the type of traffic sign, time elapse, and a road condition, is changed.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 7 illustrates an example, in which data for comparison is updated by using definition of a valid area, according to an exemplary embodiment of the present invention.

DETAILED DESCRIPTION

Figure 1A:
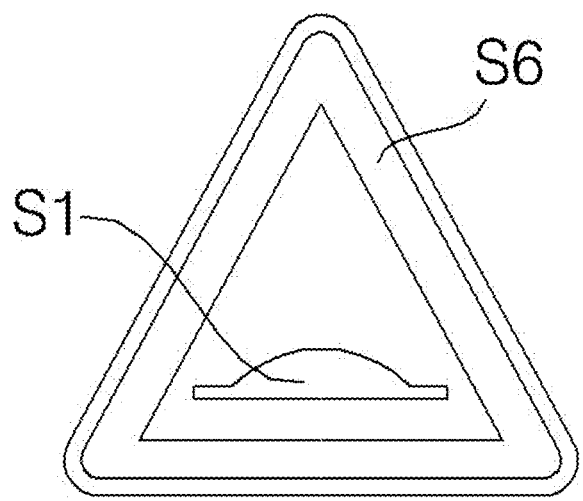
FIGS. 1A, 1B, 1C, and 1D are examples illustrating generally used traffic signs.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIGS. 1A to 1D are examples illustrating generally used traffic signs.

Figure 1B:
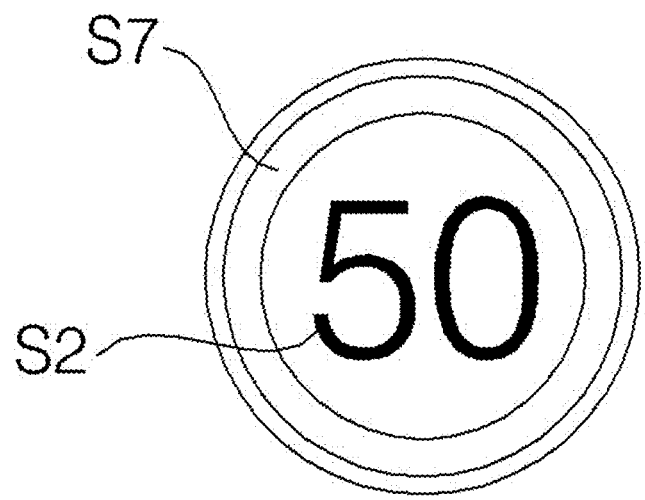
Figure 1C:
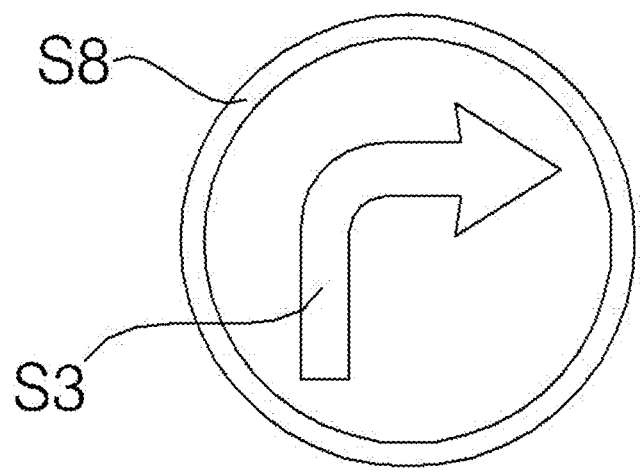
Figure 1D:
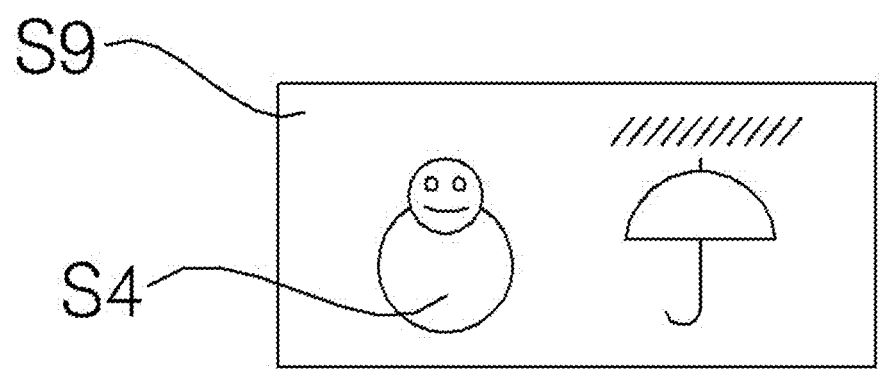

A traffic sign generally includes a caution sign, a restriction sign, a direction sign, an auxiliary sign, and the like. FIG. 1A is a sign representing a "speed bump" among the caution signs, FIG. 1B is a sign representing a "maximum speed limit (50 km/h)" among the restriction signs, FIG. 1C is a sign representing a "right turn" among the direction signs, and FIG. 1D is a sign representing a "road state (snow and rain)" among the auxiliary signs.

The traffic sign may include a first indicator and a second indicator. Referring to FIGS. 1A to 1D, the first indicators S1 through S4 stand for core information displayed by a figure, a number, a character, an arrow, and the like, and the second indicators S6 through S9 stand for information about the type of sign displayed by shapes, such as a triangle, a circle, and a quadrangle, surrounding the first indicators.

In order to transmit accurate information to a driver, the first indicator needs to be essentially detected from the traffic sign, and in order to more accurately generate information, the second indicator may be detected together with the first indicator.

In the meantime, a light emitting traffic sign means a sign including one or more light sources, and serving a function as a traffic sign through light emitted from the light source. In this case, a representative light source may be a light emitting diode (LED), but the light source is not limited thereto, and the kind of light source is not particularly limited as long as the light source may provide a driver with predetermined information by emitting light.

In the light emitting traffic sign, one or more light sources are disposed in areas corresponding to the first indicator or the first and second indicators aforementioned with reference to FIGS. 1A through 1D. For example, in describing based on the restriction sign illustrated in FIG. 2B, a white light source may be disposed in an area corresponding to the first indicator S5 to display information about a maximum speed limit, and a red light source may be disposed in an area corresponding to the second indicator S6 to display information that the corresponding sign is a restriction sign.

Hereinafter, exemplary embodiments of the present invention will be described based on the case where the light emitting traffic sign is a speed limit restriction sign similar to illustration of FIG. 2B. However, those skilled in the art will easily appreciate that the present invention is equally applicable to other signs, in addition to a speed limit restriction sign.

Figure 2A:
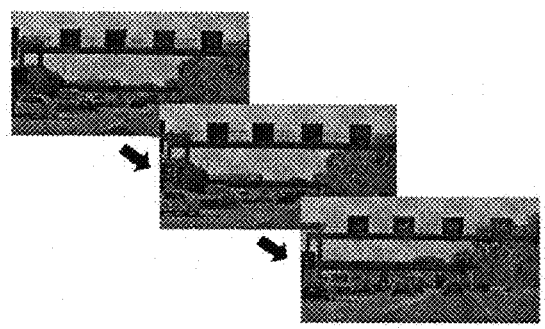
FIGS. 2A and 2B are diagrams illustrating a change of an image according to a periodical on/off operation of a light emitting traffic sign.
Figure 2B:
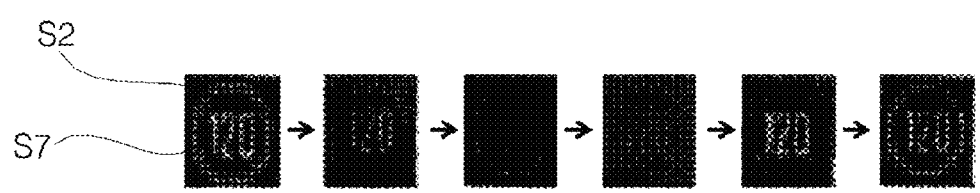

FIGS. 2A and 2B are diagrams illustrating a change of an image according to a periodic on/off operation of a light emitting traffic sign.

First, referring to FIG. 2A, four light emitting traffic signs notifying speed limit information on a structure installed on a road can be seen. A traffic sign for inducing safe driving by a driver or notifying a route and the like is installed on a road at each designated position. In FIG. 2A, light emitting traffic signs emit light at positions corresponding to four lanes, respectively, and shapes of the respective light emitting traffic signs vary over three frames, which are continuously generated by a camera of a vehicle, according to a direction of an arrow of FIG. 2A. As described above, the light source of the light emitting traffic sign periodically performs an on/off operation, so that the shape of the first and second indicators of the light emitting traffic sign varies for each image frame generated by the camera, even for the same light emitting traffic sign.

FIG. 2B separately illustrates any one of the light emitting traffic signs of FIG. 2A. Continuously generated six frames are sequentially illustrated from the left to the right according to an arrow of FIG. 2B. In particular, it can be seen that all of a first indicator S2 and a second indicator S7 are clearly displayed in the first frame from the left, definition of the first indicator S2 and the second indicator S7 in the second to fifth frames is lower than those of the first frame, and the first indicator S2 and the second indicator S7 in the sixth frame are displayed with definition similar to that of the first frame again. If any of shapes, sizes, definition, and the like of the first indicator and the second indicator is changed for each of the continuously generated images, there may be an error in recognizing the traffic sign, and sometimes, it may be impossible to recognize the traffic sign itself.

Figure 3:
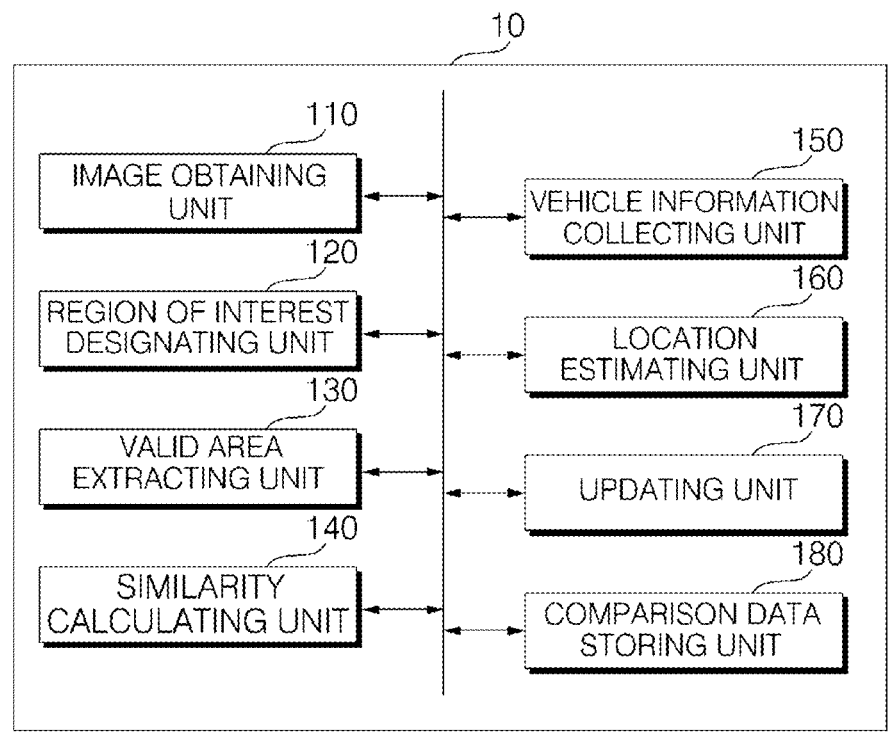
FIG. 3 is a block diagram of a traffic sign recognizing apparatus according to an exemplary embodiment of the present invention.
Figure 4:
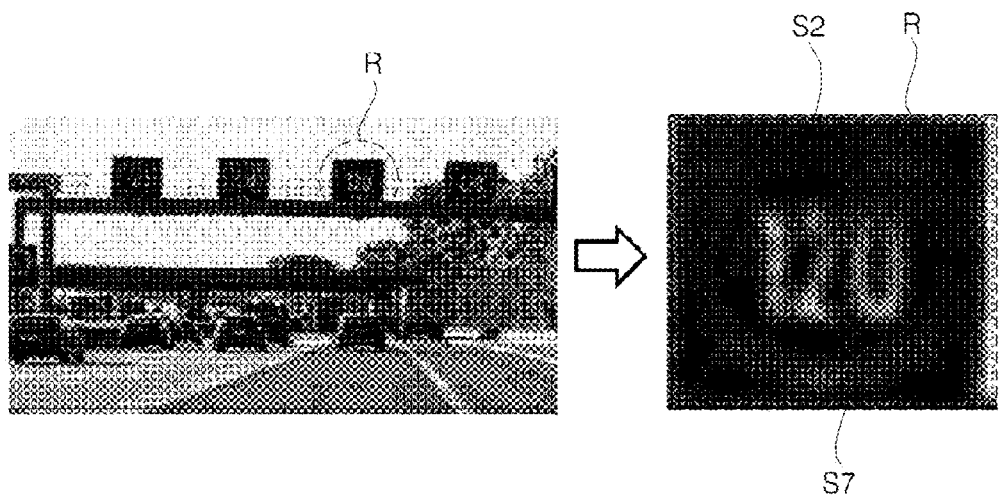
FIG. 4 illustrates an example in which a region of interest is designated from an image according to an exemplary embodiment of the present invention.
Figure 5:
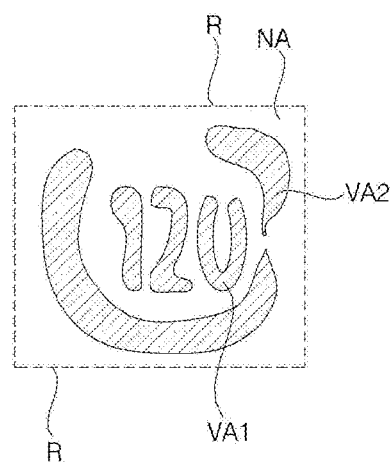
FIG. 5 illustrates an example of a valid area extracted from the region of interest according to an exemplary embodiment of the present invention.

FIG. 3 is a block diagram of a traffic sign recognizing apparatus 10 according to an exemplary embodiment of the present invention, FIG. 4 illustrates an example in which a region of interest R is designated from an image according to an exemplary embodiment of the present invention, and FIG. 5 illustrates an example in which a valid area VA is extracted from the region of interest R according to an exemplary embodiment of the present invention.

Referring to FIG. 3, the traffic sign recognizing apparatus 10 according to an exemplary embodiment of the present invention may include an image obtaining unit 110, a region of interest designating unit 120, a valid area extracting unit 130, and a similarity calculating unit 140. Further, the traffic sign recognizing apparatus 10 according to an exemplary embodiment of the present invention may further include at least one of a vehicle information collecting unit 150, a location estimating unit 160, an updating unit 170, and a comparison data storing unit 180 as necessary.

The image obtaining unit 110 obtains an image to a predetermined range from a vehicle. The image obtaining unit 110 may include one or more cameras. The traffic sign is generally located at a front side of the vehicle according to a travelling path of the vehicle, so that the camera may be mounted outside or inside of the vehicle based on a wind screen or at one side of a front bumper so as to photograph a front side of the vehicle. However, the mounted position of the camera is not limited thereto, and may vary as necessary.

The region of interest designating unit 120 recognizes a traffic sign existing within the entire area of each image obtained by the image obtaining unit 110. A first indicator and a second indicator of the traffic sign are formed by a number, a character, a figure, and the like, so that the region of interest designating unit 120 may recognize the traffic sign by using a pattern recognizing algorithm. For example, as illustrated at a left side of FIG. 4, the region of interest designating unit 120 may recognize a traffic sign including a first indicator S2 and a second indicator S7 in accordance with a travelling lane of the vehicle.

The region of interest designating unit 120 may designate a predetermined area including the traffic sign as a region of interest R. That is, as illustrated at a right side of FIG. 4, the region of interest designating unit 120 divides an area including the traffic sign from the entire area of the image. Particularly, the region of interest designating unit 120 may designate only the traffic sign as the region of interest R, or a predetermined area surrounding the traffic sign in addition to the traffic sign as the region of interest R. When the region of interest designating unit 120 designates only the traffic sign as the region of interest R, it is possible to decrease the amount of calculation required for extracting a valid area VA to be described below. By contrast, when the region of interest designating unit 120 designates a predetermined area surrounding the traffic sign in addition to the traffic sign as the region of interest R, it is possible to calculate more accurate similarity between the two of the traffic signs for each image by using information about an area except for the traffic sign. The region of interest R may be divided into a valid area VA and a non-valid area by the valid area extracting unit 130, which will be separately described below.

The traffic sign recognizing apparatus 10 according to the exemplary embodiment of the present invention may further include a vehicle information collecting unit 150 and a location estimating unit 160. The vehicle information collecting unit 150 collects vehicle information about a speed and a travelling direction of the vehicle. The image obtained by the image obtaining unit 110 is changed according to a speed and a travelling direction of the vehicle, so that the vehicle information collecting unit 150 transmits information about a speed and a travelling direction of the vehicle to the location estimating unit 160.

The location estimating unit 160 estimates a location of the traffic sign included in the image based on the vehicle information received from the vehicle information collecting unit 150. The location estimating unit 160 may calculate an estimation value indicating a degree, by which the traffic sign within the currently obtained image will be changed from a location of a previous image, with reference to the information about the speed or the travelling direction of the vehicle. For example, when the speed of the vehicle is high and the travelling direction is considerably changed for the same time, the locations of the traffic sign between the previous image and the current image may be considerably different.

The location estimating unit 160 may calculate coordinates for a location of the estimated traffic sign. Coordinate information about the estimated traffic sign may be utilized for extracting the valid area VA to be described below.

The valid area extracting unit 130 extracts a valid area VA by excluding an area of a first color from the region of interest R. For example, for the light emitting traffic sign, in order to improve visibility for light emitted from the first indicator and the second indicator, an area except for the first indicator and the second indicator in which the light source is disposed may be formed with a specific color (for example, black). Furthermore, the valid area extracting unit 130 may determine that a color of the area occupied by some light sources, which are in an off state, among the light sources disposed in the first indicator or the second indicator is black.

For another example, for a non-emitting light traffic sign, an area except for the area corresponding to the first indicator and the second indicator may be formed in white. In this case, the valid area extracting unit 130 may determine that an area hidden by garbage and the like in the areas corresponding to the first indicator and the second indicator is white.

As such, when a recognition target is a light emitting traffic sign, the non-valid area NA may be an area including the area except for the first indicator and the second indicator of the light emitting traffic sign and the area occupied by some light sources, which are in the off state, among the light sources disposed in the first indicator or the second indicator.

On the other hand, when a recognition target is a non-emitting light traffic sign, the non-valid area NA may be an area including the area except for the first indicator and the second indicator and the area hidden by garbage and the like in the area corresponding to the first indicator or the second indicator.

Referring to FIG. 5, the valid area VA extracted from the region of interest R illustrated in FIG. 4 can be seen. The valid area VA may include a first valid area VA1 related to the first indicator and the second valid area VA2 related to the second indicator. The region of interest R illustrated in FIG. 4 is extracted from the image obtained when some of the light sources are in the off state, so that a part of the figure corresponding to the first indicator and a part of a circular shape corresponding to the second indicator have a first color (for example, black). Accordingly, the area of the first color is excluded from the whole areas corresponding to the first and second indicators, so that the valid area VA extracted by the valid area extracting unit 130 may be extracted as illustrated in FIG. 5.

When the valid area extracting unit 130 completes the extraction of the valid area VA from the region of interest R, the valid area extracting unit 130 calculates valid area data including information on at least one of a size, a shape, a color, definition, and a ratio of the valid area VA. A size and a shape of the valid area VA may be utilized for resizing an image for matching the valid areas VA of the respective images, a color of the valid area VA may be utilized for discriminating the type of traffic sign, and a ratio of the valid area VA may be utilized for updating data for comparison, which will be described below.

The similarity calculating unit 140 calculates similarity between the traffic signs recognized from the respective images by using the valid area data. The similarity may be calculated for adjacent images (for example, an $N^{th}$ image and an $N-1^{th}$ image, N is a positive integer greater than 1), and for non-adjacent images (for example, an $N^{th}$ image and an $N-2^{th}$ image, N is a positive integer greater than 2). Hereinafter, an exemplary embodiment, in which similarity between an image obtained at a specific time and a subsequently obtained image is calculated, will be described.

In the meantime, the traffic sign recognizing apparatus 10 according to the exemplary embodiment of the present invention may further include a comparison data storing unit 180. The comparison data storing unit 180 may store valid area data for any one traffic sign among the previously recognized traffic signs as data for comparison.

The similarity calculating unit 140 may compare valid area data for a traffic sign recognized at a predetermined time and the data for comparison stored in the comparison data storing unit 180 and calculate similarity between the two. Here, the predetermined time may mean a time after a time at which a traffic sign related to the data for comparison is recognized.

When the calculated similarity is equal to or greater than a predetermined threshold value, the similarity calculating unit 140 may determine that the traffic sign recognized at the predetermined time is the same as the traffic sign of the data for comparison. That is, when the similarity between two or more traffic signs recognized at different times is equal to or larger than a predetermined threshold value, the similarity calculating unit 140 may determine that the two or more traffic signs, which are the targets for calculating similarity, are the same traffic sign. In this case, the threshold value may be set differently for each type of valid area data.

For example, when similarity between a valid area shape of the traffic sign recognized at the predetermined time and a valid area shape of the data for comparison is calculated as 87%, and a threshold value for a shape of the valid area VA is set to 83%, the similarity calculating unit 140 may determine that the two traffic signs are the same as each other.

The similarity calculating unit 140 may calculate similarity by performing template matching and the like only on the valid area VA, excluding the non-valid area NA, in the region of interest R. The non-valid area NA is an area which does not include information valid for determining whether the traffic signs within the images obtained at different times are the same as each other, so that it is possible to calculate similarity by using only the information about the valid area VA without considering the non-valid area NA in the region of interest R. As such, it is not the entire region of interest R that is compared at the two different times, but rather only the valid area VA is the target for calculating similarity. Accordingly, it is possible to improve performance of recognizing a traffic sign and decrease the amount of calculation.

According to the exemplary embodiment of the present invention, the updating unit 170 may update the data for comparison in order to improve performance of recognizing a traffic sign. The updating unit 170 may update the data for comparison based on a ratio of the valid area VA or definition of the valid area VA.

Figure 6A:
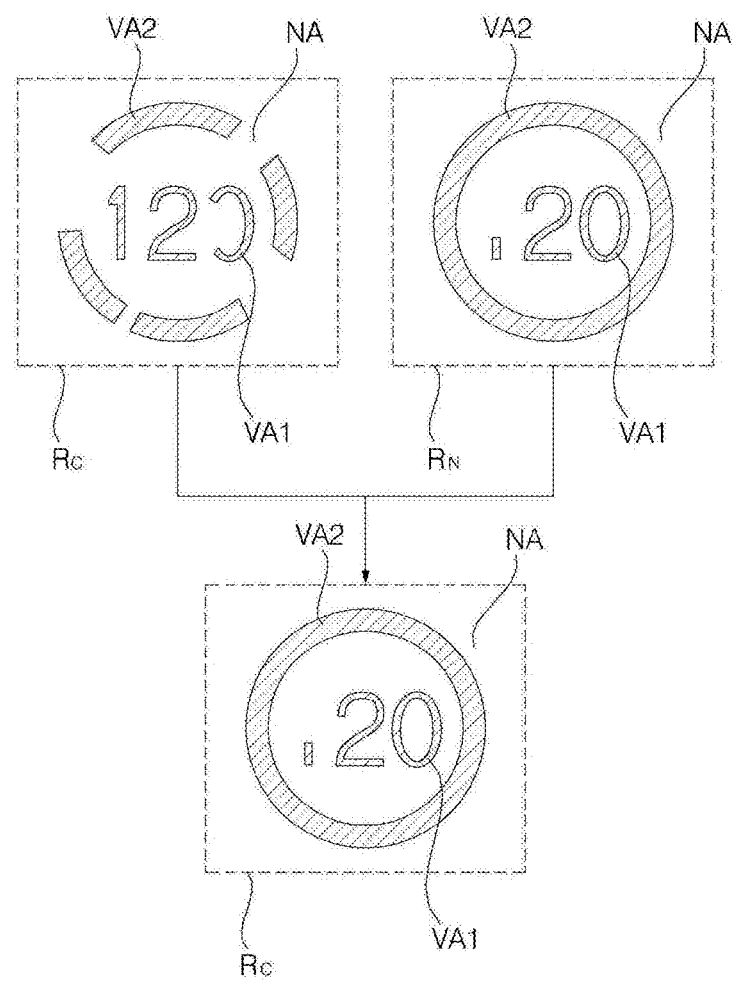
FIGS. 6A and 6B illustrate an example, in which data for comparison is updated by using a ratio of a valid area, according to an exemplary embodiment of the present invention.
Figure 6B:
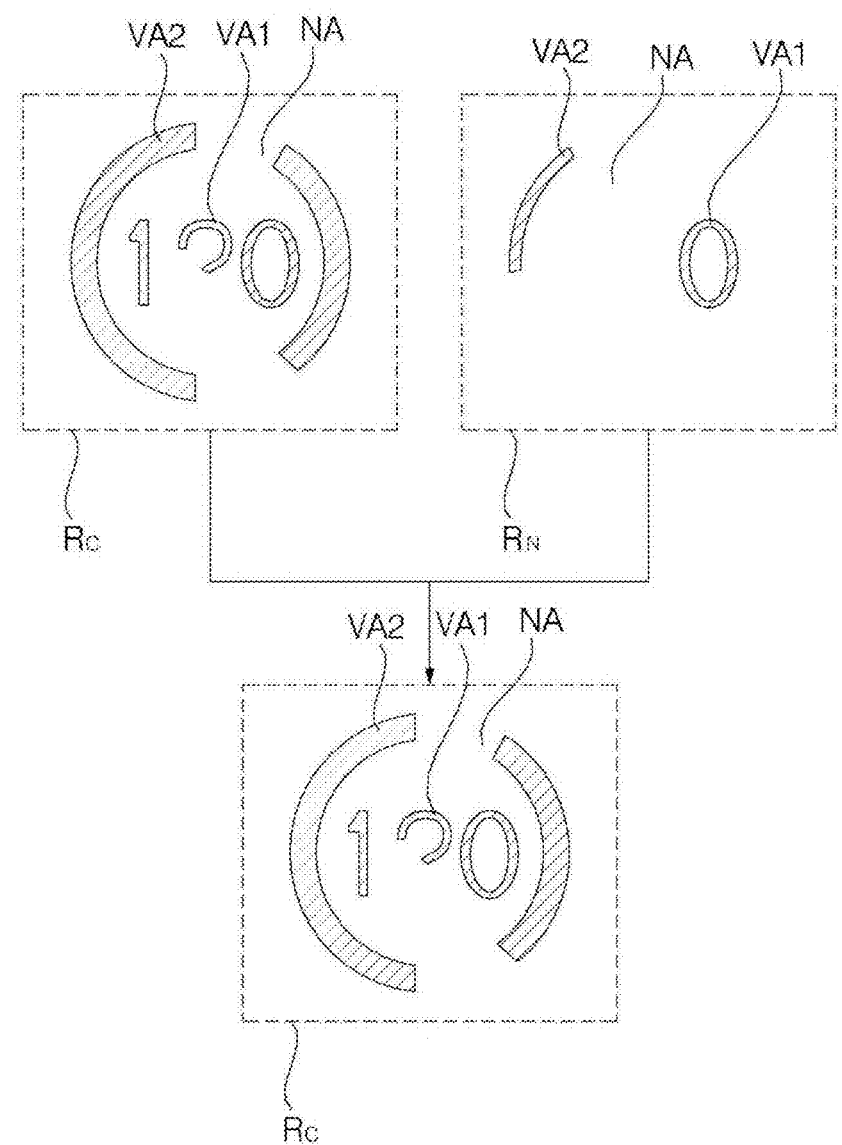

FIGS. 6A and 6B illustrate an example, in which data for comparison is updated by using a ratio of the valid area VA according to an exemplary embodiment of the present invention. Particularly, FIGS. 6A and 6B are one example, in which the updating unit 170 updates the data for comparison based on a ratio of the valid area, and a restriction sign for a maximum speed limit (120 km/h) is illustrated.

First, referring to FIG. 6A, a traffic sign $R_C$ of the data for comparison is illustrated at a left side, and a traffic sign $R_N$ of an $N^{th}$ image is illustrated at a right side. In the traffic sign $R_C$ of the data for comparison in FIG. 6A, about a half of a circular area corresponding to the second indicator corresponds to the non-valid area NA, and a part of number "0" corresponds to the non-valid area NA. By contrast, it can be seen that in the traffic sign $R_N$ of the $N^{th}$ image, a part of an upper end of number "1" corresponds to a first color, but most of the areas corresponding to the first indicator and the second indicator are extracted as the valid area VA. That is, a ratio of the valid area of the traffic sign $R_N$ of the $N^{th}$ image is larger than a ratio of the valid area of the traffic sign $R_C$ of the data for comparison. In this case, as illustrated at a lower end of FIG. 6A, the updating unit 170 may update existing data for comparison so that valid area data for the traffic sign $R_N$ of the $N^{th}$ image is added to the data for comparison. The reason is that the traffic sign $R_N$ of the $N^{th}$ image may provide more accurate information about the traffic sign standing for the maximum speed limit 120 km/h.

Referring to FIG. 6B as an example different from FIG. 6A, a traffic sign $R_C$ of the data for comparison is illustrated at a left side, and a traffic sign $R_N$ of an $N^{th}$ image is illustrated at a right side. In the traffic sign $R_C$ of the data for comparison, a part of a circular area corresponding to the second indicator and a part of a lower end of number "2" correspond to the non-valid area NA. By contrast, in the traffic sign $R_N$ of the $N^{th}$ image, most of the areas corresponding to the first indicator and number "12" correspond to the non-valid area NA. That is, a ratio of the valid area of the traffic sign $R_C$ related to the data for comparison is larger than a ratio of the valid area of the traffic sign $R_N$ of the $N^{th}$ image. Accordingly, the updating unit 170 may not perform the update on the data for comparison as illustrated at a lower end of FIG. 6B. The reason is that the traffic sign $R_C$ of the data for comparison may provide more accurate information about the traffic sign representing the maximum speed limit 120 km/h.

In the meantime, the updating unit 170 may set an area in the valid area VA of the traffic sign recognized at the predetermined time having higher definition than that of the valid area VA of the traffic sign related to the data for comparison as a target area, and update the definition of the valid area of the traffic sign related to the data for comparison to that of the target area.

Figure 8A:
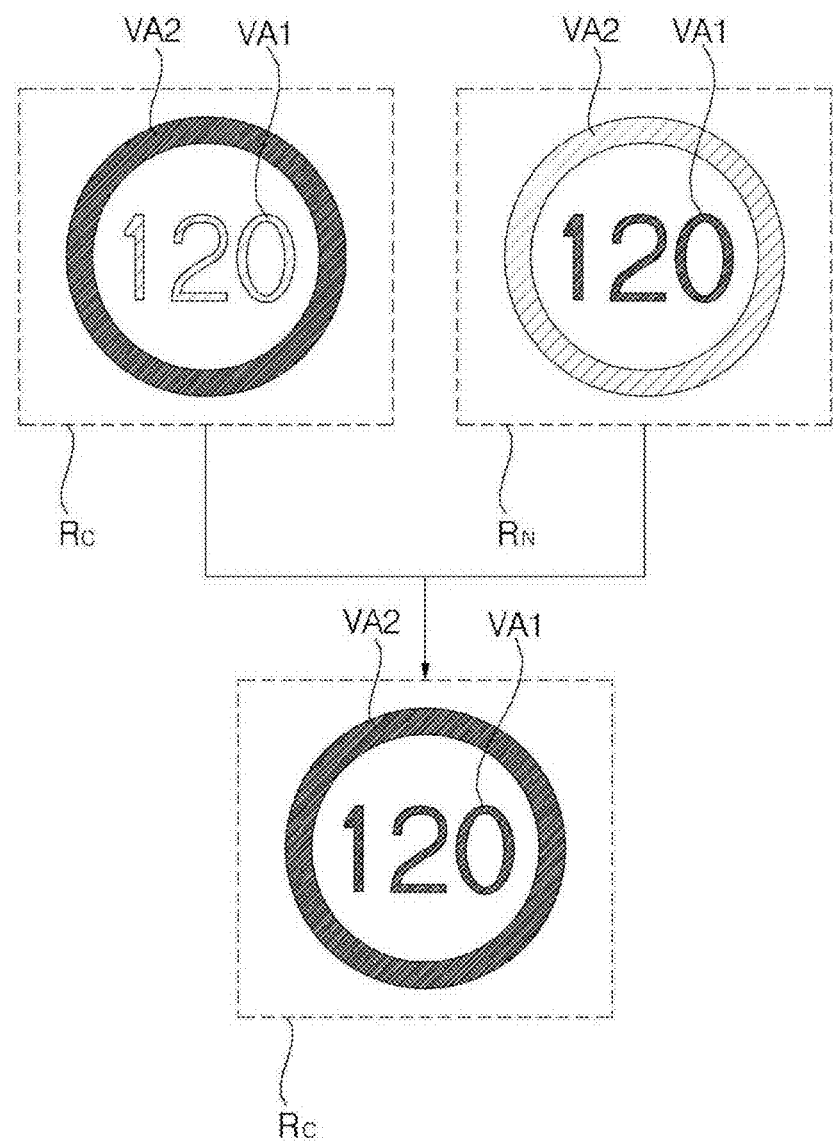
FIGS. 8A and 8B illustrate another example, in which data for comparison is updated by using definition of a valid area, according to an exemplary embodiment of the present invention.
Figure 8B:
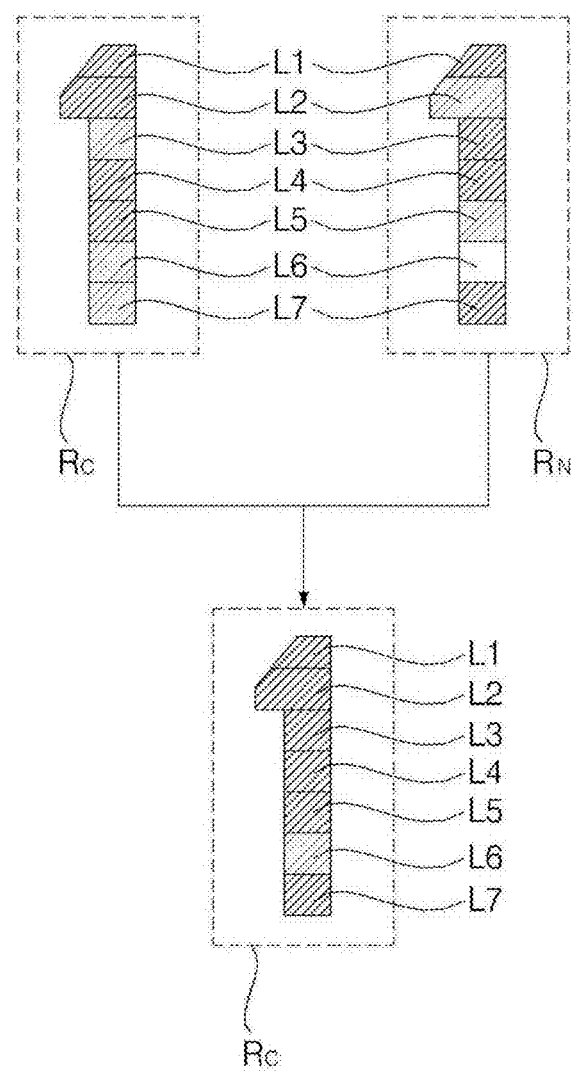

FIG. 7 illustrates an example, in which data for comparison is updated by using a definition of the valid area VA according to an exemplary embodiment of the present invention, and FIGS. 8A and 8B illustrate another example, in which data for comparison is updated by using definition of the valid area VA according to an exemplary embodiment of the present invention.

Referring to FIG. 7, a traffic sign $R_C$ of the data for comparison is illustrated at the left side, and a traffic sign $R_N$ of an $N^{th}$ image is illustrated at the right side. The updating unit 170 may extract an area having higher definition than that of the traffic sign $R_C$ related to the data for comparison from the traffic sign $R_N$ of the $N^{th}$ image and set the extracted area as a target area. In the case of FIG. 7, areas in the traffic sign $R_N$ of the $N^{th}$ image have higher definition than that of the traffic sign $R_C$ of the data for comparison regarding a cut area of the second indicator and an area corresponding to a cut area of number "0" of the first indicator, so that the areas having higher definition may be set as target areas. In this case, as illustrated at a lower end of FIG. 7, the updating unit 170 may update definition information of the data for comparison to that of the target areas.

FIGS. 8A and 8B are different from FIG. 7 in that definition of the valid area VA in one image is different for each area. For convenience of the description, it is assumed that all of the areas corresponding to the first indicator and the second indicator are extracted as the valid areas VA.

First, referring to FIG. 8A, it can be seen that definition of the second indicator of the traffic sign $R_C$ of the data for comparison illustrated at the left side is higher than definition of the first indicator, and definition of the first indicator of the traffic sign $R_N$ of the $N^{th}$ image illustrated at the right side is higher than definition of the second indicator. That is, an area corresponding to the first indicator of the traffic sign $R_N$ of the $N^{th}$ image may be set as a target area. In this case, as illustrated at a lower end of FIG. 8A, the updating unit 170 may update the data for comparison so that the area corresponding to the first indicator of the traffic sign related to the data for comparison has the definition of the area corresponding to the first indicator of the traffic sign $R_N$ of the $N^{th}$ image.

Referring to FIG. 8B, the traffic sign $R_C$ of the data for comparison is illustrated at the left side, and the traffic sign $R_N$ of the $N^{th}$ image is illustrated at the right side, and, for convenience, only an area for the number "1" of the first indicator in the restriction sign for the maximum speed limit (120 km/h) is illustrated.

The updating unit 170 may divide the valid area VA into a plurality of sub areas (for example, pixels), compare definition between the traffic sign RC related to the data for comparison and the traffic sign $R_N$ of the $N^{th}$ image for each sub area, and determine whether to update each sub area.

Referring back to FIG. 8B, in order to determine whether to update each sub area related to the data for comparison, the updating unit 170 may divide an area corresponding to the number "1" in the valid area VA into a plurality of sub areas L1 to L7. First, second, fourth, and fifth sub areas L1, L2, L4, and L5 of the traffic sign $R_C$ related to the data for comparison have a first definition, and third, sixth, and seventh sub areas L3, L6, and L7 have a second definition. By contrast, first, third, fourth, and seventh sub areas L1, L3, L4, and L7 of the traffic sign $R_N$ of the $N^{th}$ image have the first definition, second and fifth sub areas L2 and L5 have the second definition, and a sixth sub area L6 has a third definition. Here, the first definition is higher than the second definition, and the second definition is higher than the third definition. In this case, the updating unit 170 sets the third sub area L3 and the seventh sub area L7 in the traffic sign $R_N$ of the $N^{th}$ image having the higher definition than that of the traffic sign $R_C$ related to the data for comparison as target areas. Accordingly, as illustrated at a lower end of FIG. 8B, it can be seen that the sub areas may be updated so that the first, second, third, fourth, fifth, and seventh sub areas L1, L2, L3, L4, L5 and L7 of the traffic sign $R_C$ for the data for comparison have the first definition, and the sixth sub area L6 has the second definition.

In the meantime, only the region for the number "1" in the valid area VA is illustrated in FIG. 8B, but this is for convenience of the description, and it should be appreciated that the aforementioned method may be equally applied to the entire valid area VA.

Figure 9:
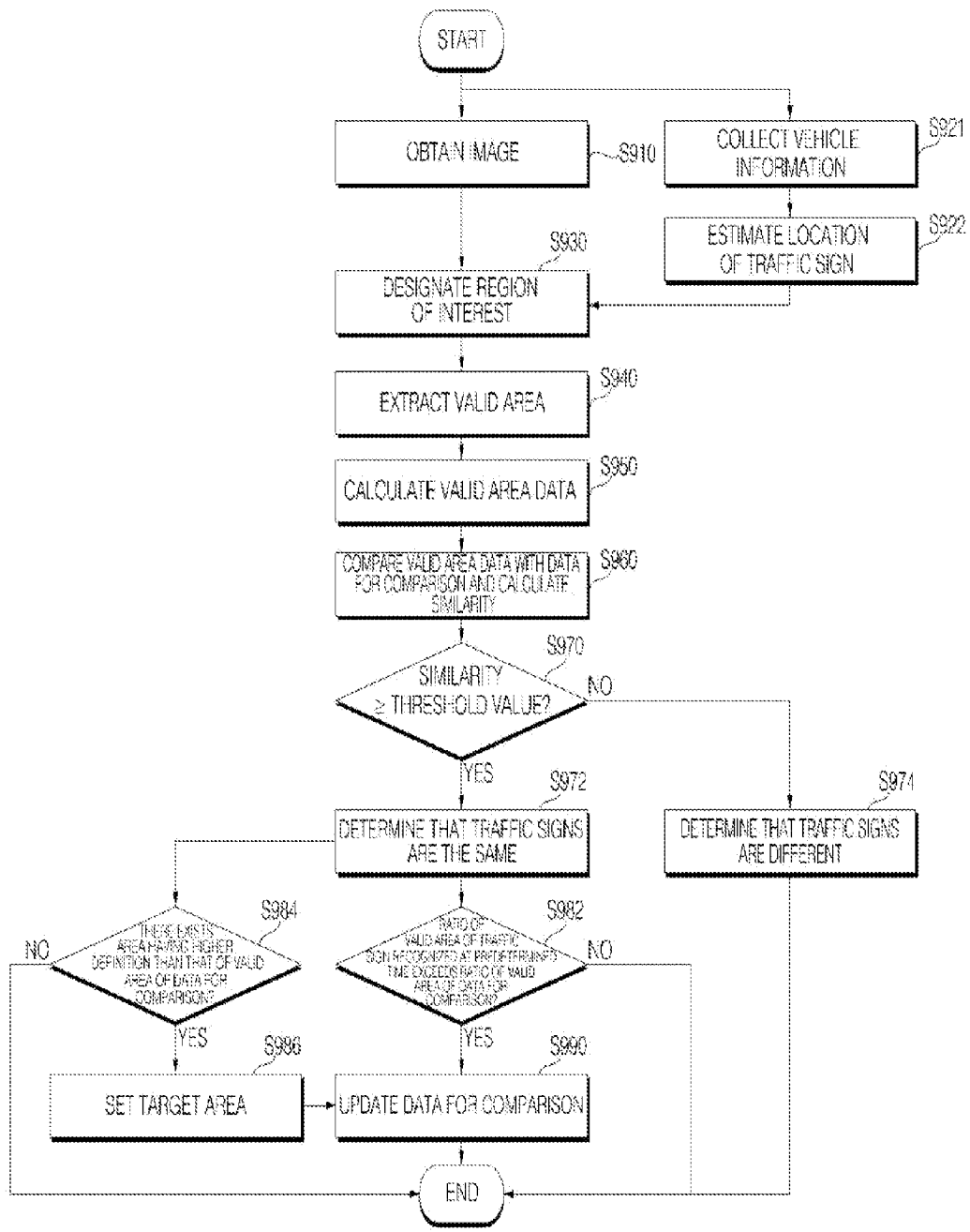
FIG. 9 is a flowchart illustrating an operating method of the traffic sign recognizing apparatus according to an exemplary embodiment of the present invention.

FIG. 9 is a flowchart illustrating an operating method of the traffic sign recognizing apparatus 10 according to an exemplary embodiment of the present invention.

Referring to FIG. 9, the image obtaining unit 110 obtains an image from a vehicle at a predetermined range (S910).

Next, the region of interest designating unit 120 designates an area including a traffic sign within an image as a region of interest R (S930).

Before operation S930, the vehicle information collecting unit 150 may collect vehicle information comprising a speed and a travelling direction of the vehicle (S921), and the location estimating unit 160 may estimate a location of the traffic sign included in the image based on the vehicle information (S922). Accordingly, the region of interest designating unit 120 may utilize location information (for example, coordinates) about the traffic sign estimated by the location estimating unit 160 when designating the region of interest R (S930).

The valid area extracting unit 130 extracts a valid area VA by excluding an area of a first color from the entire region of interest R designated by the region of interest designating unit 120 (S940). The valid area VA is an area including valid information in the traffic sign, and may be an area corresponding to the first indicator and second indicator, and an area of the first color in the region of interest R is a non-valid area NA.

The valid area extracting unit 130 calculates valid area data (S950). The valid area data may include information on at least one of a size, a shape, a color, definition, and a ratio of the valid area VA.

The similarity calculating unit 140 compares valid area data calculated at a predetermined time and pre-stored data for comparison and calculates similarity (S960). The similarity may be calculated by comparing information on a size, a shape, a color, definition, or a ratio of the valid area VA between the data for comparison and the valid area data calculated at the predetermined time. For example, the similarity may be calculated by comparing only the shapes of the valid areas VA, or by assigning a weighted value to each of the results of simultaneous comparison of the sizes and the ratios of the valid areas VA.

The similarity calculating unit 140 compares the similarity calculated in S960 with a predetermined threshold value (S970).

When the similarity is equal to or greater than the predetermined threshold value, the similarity calculating unit 140 may determine that the traffic sign for the valid area data calculated at the predetermined time is the same as the traffic sign related to the data for comparison (S972). When the similarity is smaller than the predetermined threshold value, the similarity calculating unit 140 may determine that the traffic sign for the valid area data calculated at the predetermined time is different from the traffic sign related to the data for comparison (S974).

When it is determined by the similarity calculating unit 140 that the traffic sign for the valid area data calculated at the predetermined time is the same as the traffic sign related to the data for comparison, the updating unit 170 may determine whether to update the data for comparison.

For example, the updating unit 170 may compare whether a ratio of the valid area VA of the traffic sign recognized at the predetermined time exceeds a ratio of the valid area VA of the data for comparison (S982), and when the ratio of the valid area VA of the traffic sign recognized at the predetermined time exceeds the ratio of the valid area VA of the data for comparison as a result of the comparison, the updating unit 170 may update the data for comparison (S990). That is, in S990, the existing data for comparison may be updated so that the valid area data for the traffic sign recognized at the predetermined time is set as the data for comparison.

For another example, the updating unit 170 determines whether an area having higher definition than that of the valid area VA of the traffic sign related to the data for comparison exists in the valid area VA of the traffic sign recognized at the predetermined time (S984), and when it is determined that the area having higher definition than that of the valid area VA of the traffic sign related to the data for comparison exists, the updating unit 170 may set the corresponding area as a target area (S986). Next, the updating unit 170 may update the data for comparison (S990). Particularly, the updating unit 170 may update definition information of the data for comparison to that of the target area.

The above-mentioned exemplary embodiments of the present invention are not embodied only by an apparatus and a method. Alternatively, the above-mentioned exemplary embodiments may be embodied by a program executing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An apparatus for recognizing a traffic sign, comprising:
a camera configured to obtain an image from a vehicle at a predetermined range; and
a traffic sign recognizing apparatus comprising a processor configured to execute instructions to perform processes comprising:
recognizing a traffic sign within the image, and designating an area including the traffic sign as a region of interest;
extracting a valid area excluding an area of a first color from the region of interest, and calculating valid area data; and
calculating similarity between the traffic signs recognized from respective images by using the valid area data,
wherein the traffic sign is a light emitting traffic sign including one or more light sources repeatedly turned on and off, and the first color excluded from the region of interest is set according to non-light emitting portions of the traffic sign.

2. The apparatus of claim 1, wherein the valid area data includes information on at least one of a size, a shape, a color, definition, and a ratio of the valid area.

3. The apparatus of claim 1, wherein the executable instructions are configured to designate only the traffic sign as the region of interest.

4. The apparatus of claim 1, further comprising:
executable instructions configured to collect vehicle information including information on a speed and a travelling direction of the vehicle.

5. The apparatus of claim 4, further comprising:
executable instructions configured to estimate a location of the traffic sign included in the image based on the vehicle information,
wherein the executable instructions recognizes the traffic sign within the image with reference to the estimated location.

6. The apparatus of claim 1, further comprising:
a comparison data storing unit configured to store valid area data of any one of previously recognized traffic signs as data for comparison.

7. The apparatus of claim 6, wherein the processor is configured with executable instructions to compare valid area data for a traffic sign recognized at a predetermined time with the data for comparison, and calculate similarity between the valid area data and the data for comparison.

8. The apparatus of claim 7, wherein when the similarity is equal to or greater than a predetermined threshold value, the processor determines that the traffic sign recognized at the predetermined time is the same as the traffic sign related to the data for comparison.

9. The apparatus of claim 7, further comprising:
executable instructions configured to update the data for comparison to valid area data of the traffic sign recognized at the predetermined time when a ratio of a valid area of the traffic sign recognized at the predetermined time exceeds a ratio of a valid area of the data for comparison.

10. The apparatus of claim 7, further comprising:
executable instructions configured to set an area in a valid area of the traffic sign recognized at the predetermined time having higher definition than that of a valid area of the traffic sign related to the data for comparison as a target area, and update definition of the valid area of the traffic sign related to the data for comparison to that of the target area.

11. The apparatus of claim 7, further comprising:
executable instructions configured to divide the valid area into a plurality of sub areas and compare definition between two of the sub areas.

12. An operating method of an apparatus for recognizing a traffic sign, comprising:
obtaining an image from a vehicle at a predetermined range;
designating an area including a traffic sign within the image as a region of interest;
extracting a valid area except for an area of a first color in the region of interest;
calculating valid area data including information on at least one of a size, a shape, a color, definition, and a ratio of the valid area; and
comparing valid area data calculated at a predetermined time with pre-stored data for comparison and calculating similarity of the traffic sign,
wherein the data for comparison is valid area data for the traffic sign recognized before the predetermined time and
wherein the traffic sign is a light emitting traffic sign including one or more light sources repeatedly turned on and off, and the first color excluded from the region of interest is set according to non-light emitting portions of the traffic sign.

13. The operating method of claim 12, further comprising:
collecting vehicle information including a speed and a travelling direction of the vehicle.

14. The operating method of claim 13, further comprising:
estimating a location of the traffic sign included in the image based on the vehicle information,
wherein the step of designating of the region of interest includes recognizing the traffic sign included in the image with reference to the estimated location.

15. The operating method of claim 12, further comprising:
determining whether the similarity is greater than or less than a predetermined threshold value; and
determining that a traffic sign recognized at the predetermined time is the same as a traffic sign of the data for comparison when the similarity is greater than the predetermined threshold value.

16. The operating method of claim 12, further comprising:
determining whether a ratio of a valid area of the traffic sign recognized at the predetermined time is greater than or less than a ratio of a valid area of the data for comparison; and
updating the data for comparison to valid area data of the traffic sign recognized at the predetermined time when the ratio of the valid area of the traffic sign recognized at the predetermined time is greater than the ratio of the valid area of the data for comparison.

17. The operating method of claim 12, further comprising:
setting an area in a valid area of the traffic sign recognized at the predetermined time having higher definition than that of a valid area of a traffic sign related to the data for comparison as a target area; and
updating definition of the valid area of the traffic sign related to the data for comparison to that of the target area.

18. The operating method of claim 12, further comprising:
dividing the valid area into a plurality of sub areas; and
comparing definition between two of the sub areas.

* * * * *